United States Patent
Klein

(10) Patent No.: US 11,993,035 B2
(45) Date of Patent: *May 28, 2024

(54) PRODUCTION METHOD FOR A COMPOSITE FIBER COMPONENT, COMPOSITE FIBER COMPONENT, TESTING METHOD FOR A COMPOSITE FIBER COMPONENT, COMPUTER PROGRAM, MACHINE-READABLE STORAGE MEDIUM AND APPARATUS

(71) Applicant: Robert Bosch GmbH, Stuttgart (DE)

(72) Inventor: Linda Klein, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 464 days.

This patent is subject to a terminal disclaimer.

(21) Appl. No.: 17/297,875

(22) PCT Filed: Dec. 3, 2019

(86) PCT No.: PCT/EP2019/083520
§ 371 (c)(1),
(2) Date: May 27, 2021

(87) PCT Pub. No.: WO2020/115056
PCT Pub. Date: Jun. 11, 2020

(65) Prior Publication Data
US 2022/0055322 A1    Feb. 24, 2022

(30) Foreign Application Priority Data
Dec. 5, 2018 (DE) ...................... 10 2018 221 010.1

(51) Int. Cl.
*B29C 70/70* (2006.01)
*B29C 70/48* (2006.01)
(Continued)

(52) U.S. Cl.
CPC .............. *B29C 70/70* (2013.01); *B29C 70/48* (2013.01); *G01N 3/08* (2013.01); *G01P 15/08* (2013.01)

(58) Field of Classification Search
CPC .......... B29C 70/70; B29C 70/48; G01N 3/08; G01P 15/08
See application file for complete search history.

(56) References Cited

U.S. PATENT DOCUMENTS 5,495,772 A * 3/1996 Dinzburg ................. G01N 3/08
                                                    73/826
2003/0094734 A1* 5/2003 Deckard ................ B33Y 10/00
                                                   204/488
(Continued)

FOREIGN PATENT DOCUMENTS

CN        102582089 A     7/2012
CN        103213288 A     7/2013
(Continued)

OTHER PUBLICATIONS

International Search Report corresponding to PCT Application No. PCT/EP2019/083520, mailed Mar. 10, 2020 (German and English language document) (6 pages).

*Primary Examiner* — Nathaniel T Woodward
(74) *Attorney, Agent, or Firm* — Maginot, Moore & Beck LLP

(57) ABSTRACT

A method for producing a composite fiber component, in which a sensor apparatus having a flexible circuit carrier and/or a sensor module, in particular a micromechanical acceleration sensor module, is integrated, includes loading a tool for producing the composite fiber component with textile layers and the sensor apparatus; closing, in particular air-tight sealing, of the loaded tool and compressing the textile layers and the sensor apparatus; introducing a liquid matrix, in particular a resin, in particular a pure resin, into (Continued)

the sealed tool to produce the composite fiber component; detecting, in particular in real time, an acceleration relative to the introducing and/or sealing by means of the sensor apparatus and/or the sensor module of the sensor apparatus; and deriving and/or evaluating a process parameter of the production method depending on the detected acceleration.

19 Claims, 3 Drawing Sheets

(51) Int. Cl.
  *G01N 3/08* (2006.01)
  *G01P 15/08* (2006.01)

(56) References Cited

U.S. PATENT DOCUMENTS

2013/0225788 A1* 8/2013 Meegan ................ C08G 59/56
427/386

2016/0318214 A1* 11/2016 Pinillos Martínez ....................... B29C 66/73753
2021/0010940 A1* 1/2021 Klein ...................... B29C 70/54

FOREIGN PATENT DOCUMENTS

| | | | |
|---|---|---|---|
| CN | 105510822 A | 4/2016 | |
| CN | 107443774 A | 12/2017 | |
| DE | 10 2006 035 274 A1 | 2/2008 | |
| DE | 10 2009 056 895 A1 | 6/2011 | |
| DE | 10 2010 062 695 A1 | 6/2012 | |
| DE | 10 2016 220 032 A1 | 4/2018 | |
| EP | 1347026 A1 * | 9/2003 | ............... B05D 5/10 |
| JP | H4-56462 A | 2/1992 | |
| JP | H6-160355 A | 6/1994 | |
| JP | H9-286032 A | 11/1997 | |
| JP | 2011039767 A * | 2/2011 | |
| JP | 2013-75471 A | 4/2013 | |
| JP | 2017-114110 A | 6/2017 | |
| WO | 2012/076465 A1 | 6/2012 | |
| WO | 2016/043155 A1 | 3/2016 | |
| WO | 2018/069066 A1 | 4/2018 | |

* cited by examiner

PRODUCTION METHOD FOR A COMPOSITE FIBER COMPONENT, COMPOSITE FIBER COMPONENT, TESTING METHOD FOR A COMPOSITE FIBER COMPONENT, COMPUTER PROGRAM, MACHINE-READABLE STORAGE MEDIUM AND APPARATUS

This application is a 35 U.S.C. § 371 National Stage Application of PCT/EP2019/083520, filed on Dec. 3, 2019, which claims the benefit of priority to Serial No. DE 10 2018 221 010.1, filed on Dec. 5, 2018 in Germany, the disclosures of which are incorporated herein by reference in their entirety.

The present disclosure relates to a production method for a fiber composite component, a correspondingly produced fiber composite component, a test method for a correspondingly produced fiber composite component, a computer program and machine-readable storage medium corresponding thereto, and also a device corresponding thereto.

BACKGROUND

WO 2018/069066 A1 discloses a method for arranging a number of micromechanical acceleration sensors on or in a plastics component, in particular a fender, and a corresponding plastics component, in particular bumper.

In step A of the method, the micromechanical acceleration sensor is fixedly positioned into or onto a flexible circuit carrier, wherein the micromechanical acceleration sensor is contacted with an integrated conductor track structure of the flexible circuit carrier.

In step B of the method, at least regionally the micromechanical acceleration sensor and the flexible circuit carrier are arranged onto or into the plastics component in such a way that the integrated conductor track structure of the flexible circuit carrier is at least partly exposed.

DE 10 2016 220 032 A1 discloses a sensor device for a vehicle, in particular a motor vehicle, comprising at least one sensor module and comprising at least one connecting line connected to the sensor module, for electrically contacting the sensor module.

Provision is made for the connecting line to be embodied as a conductor foil on which a plurality of different sensor modules are arranged and housed by a respective encapsulation or a common encapsulation surrounding the conductor foil at least in sections.

In the course of producing fiber composite structures, such as fiber composite components, by methods such as Liquid Composite Molding (LCM) or Liquid Resin Injection (LRI), by way of various approaches sensor technologies are used to detect the conditions during the production process steps. For this process monitoring, in one instance, sensors, so-called Tool Mounted Sensors (TMS), are introduced into the production tool.

However, said sensors leave behind traces on the end product; moreover, they may lose contact with the component, said contact being required for the sensing, owing to the shrinkage of the resin introduced into the tool.

In a second instance, non-contact measurement methods are a solution to this problem. However, these methods cannot always be realized.

Thirdly, sensors are therefore also integrated directly into the structural construction in the tool. Variables that are monitored during the process monitoring are usually the flow front (for checking complete matrix infusion), impregnation of the inserted textile fibers or the textile semifinished product (textile layers) and the degree of curing of the structural component composed of matrix and fibers or textile semifinished product.

Dielectric and optical or thermal measurement methods can be used for this purpose.

Typical measurement methods are direct voltage analysis (DC analysis), dielectric analysis (DEA) or electrical time domain reflectometry (ETDR).

To that end, use is made of DC point sensors or electrodes introduced in the tool or structural component, for example. It is also known to use the SMARTweave method on the basis of fiber-based planar electrodes of grids of a plurality of dielectric sensors, of carbon fibers or of specially developed buckypapers composed of entangled Carbon Nano Tube (CNT) strands, of specially developed two-conductor sensors or of Fringing Electric Field Sensors (FEF sensors), which measure material properties as a function of location and time.

In order to detect the propagation of the flow front or the mold filling or the degree of curing of the fiber composite component, the thermodynamic and/or mechanical properties of the matrix are also used. This is done using pressure sensors or (micro-) thermocouples. Optical detection of the flow front is possible using Fiber Optical Sensors (FOS), Optical Fiber Refractometers (OFR), optical fiber interferometers (OFI) or (fiber optical) spectrometers that are integrated in the structural construction.

For a non-contact measurement method in the tool mold, use is made of ultrasound, e.g. by way of ultrasonic transducers or an introduced copper wire.

Further possible sensor technologies based on electrical measurement principles are direct current resistance (DCR) sensors, conductive filaments, microbraidings or Fiber Bragg Grating (FBG) sensor.

Furthermore, thermography is suitable for determining the degree of curing.

SUMMARY

Against this background, the present disclosure provides a method for producing a fiber composite component. A sensor device is integrated in the fiber composite component, i.e. arranged within the fiber composite component. The sensor device has a flexible circuit carrier and/or a sensor module. The method comprises the following steps:

The flexible circuit carrier can have one or a plurality of sensor modules.

Feeding a tool for producing the fiber composite component with textile layers, i.e. with textile fibers or a textile semifinished product, and the sensor device.

Closing the feeded tool and compressing the textile layers and the sensor device.

Introducing a liquid matrix for producing the fiber composite component.

Detecting an acceleration in relation to the matrix flow during the introducing and/or closing, by means of the sensor device or the sensor module of the sensor device.

Deriving and/or evaluating a process parameter of the production method depending on the detected acceleration.

The evaluation of the derived process parameters can be used for the optimization thereof (process optimization).

In the present case, a fiber composite component can be understood to mean a component that consists of a fiber composite material. A fiber composite material generally arises as a result of an interacting composite composed of textile fibers or a textile semifinished product and a matrix between the fibers or the textile semifinished product. The matrix is filler and adhesive. What is typical of fiber composite materials is that the interaction of the composite gives rise to a material having properties of higher quality in comparison with the properties of the fibers and the matrix.

The fiber composite component can be a body part for a vehicle; e.g. a bumper component or a component of the longitudinal side of the vehicle.

The fiber composite component can be a component from, inter alia, the field of mechanical and plant engineering, medical technology, the fields of aviation and space engineering, energy, offshore, robotic, and consumer products.

Furthermore, the fiber composite component can be a piece of sports equipment.

A flexible circuit carrier can comprise, inter alia, silicones, polyurethanes, polyamides, or thermoplastics. In this regard, the flexible circuit carrier can be deformed flexibly; in particular, the integrated conductor track structure can be correspondingly deformed plastically, as a result of which substantially the flexible circuit carrier can be adapted to a geometry or shape of the fiber composite component. The flexible circuit carrier can be a conductor foil.

The sensor module can be an electronic and/or electrical component for detecting an acceleration, i.e. an acceleration sensor module. The sensor module can be a micromechanical sensor module. The sensor module can be a micromechanical sensor module in the manner of microelectromechanical systems (MEMS).

The steps of loading, closing and introducing have a mandatory order corresponding to the order presented. The steps of detecting and deriving can be effected in parallel with the other steps of the method. These steps can be effected multiply or regularly or permanently or continuously during the production method.

The disclosure is based on the insight that a sensor device that is arranged in a fiber composite component and detects an acceleration, during the process of introducing a liquid matrix for producing the fiber composite component, is momentarily deflected or accelerated by the incoming flow front. In the event of detection of the acceleration in real time, this can be easily identified. The deflection or acceleration thus detected allows a conclusion to be drawn about the incoming melt (the liquid matrix). As a result, by way of the detected acceleration signal, the process parameters of resin injection (such as injection pressure, rate or temperature) or the point in time of resin injection in the overall process of the production method can be derived, evaluated and optimized by means of the sensor device that is arranged or integrated into the fiber composite component produced in this case. The detected acceleration signal can furthermore be used for checking or evaluating the process parameters used in the production process and thus also for checking and evaluating the product produced.

Furthermore, as early as upon closing the tool, effects can be detected in the sensor signal and the process parameters for closing the tool (closing speed or force, inter alia) in the production method or the point in time of closing in the overall process can likewise be derived and/or evaluated therefrom. By way of example, the point in time of closing the tool can be identified in the detected acceleration signal.

The evaluation of the derived process parameters can be used for the optimization thereof.

The closing can be effected in such a way that the tool with the received textile fibers or the textile semifinished product (textile layers) and the received sensor device are effected in an airtight manner, e.g. by means of screw or compressive/pressure force.

The liquid matrix can be a resin. The resin can be a pure resin.

The detection of the acceleration can be effected in real time.

By means of the method according to the present disclosure, in the course of producing a fiber composite component having a sensor device that is arranged in a fiber composite component and that detects an acceleration, a secondary additional function of monitoring the production process is already realized during the production of the component.

According to one embodiment of the production method according to the present disclosure, in the step of feeding,
  the sensor device and/or the flexible circuit carrier are inserted between the textile fibers or the textile semifinished product (textile layers) and the sensor device and/or the flexible circuit carrier are positioned, in particular in relation to the textile fibers or the textile semifinished product (textile layers) and/or the tool, and
  the sensor device and/or the flexible circuit carrier are fixed.

The fixing can be effected by means of a fixing device. Fixing to the textile fibers or the textile semifinished product (textile layers) for the fiber composite component would also be conceivable. Fixing for example to one of the textile layers can be effected by means of an adhesive or a binder. Furthermore, fixing by stitching or weaving would be conceivable.

According to one embodiment of the production method according to the present disclosure, the method comprises the additional step of opening the tool after the step of introducing the matrix and subsequently curing the fiber composite component in the tool, wherein the steps of detecting and deriving and/or evaluating are also effected in relation to opening.

The evaluation of the derived process parameters can be used for the optimization thereof.

A further aspect of the present disclosure is a fiber composite component. The fiber composite component comprises a sensor device with a flexible circuit carrier and/or a sensor module and is produced by means of a production method according to the present disclosure.

The sensor module can be an electronic and/or electrical component for detecting an acceleration, i.e. an acceleration sensor module. The sensor module can be a micromechanical sensor module. The sensor module can be a micromechanical sensor module in the manner of microelectromechanical systems (MEMS).

A further aspect of the present disclosure is a method for testing a fiber composite component. A sensor device with a flexible circuit carrier and/or a sensor module is integrated in the fiber composite component. The method comprises the following steps:

Detecting an acceleration by means of the sensor device or the sensor module of the sensor device.

Determining the degree of curing of the fiber composite component depending on the detected acceleration.

The test method can be carried out during the curing of a fiber composite component in the context of the production thereof. This can involve the curing during the production of a fiber composite component according to the production method according to the present disclosure.

The fiber composite component to be tested can be a fiber composite component according to the present disclosure.

The sensor module can be an electronic and/or electrical component for detecting an acceleration, i.e. an acceleration sensor module. The sensor module can be a micromechanical sensor module. The sensor module can be a micromechanical sensor module in the manner of microelectromechanical systems (MEMS).

The detecting can be effected in reaction to a predetermined impulse being applied to the fiber composite component and/or the tool for producing a fiber composite component having the fiber composite component to be tested.

According to one embodiment of the test method according to the present disclosure, the method comprises the step of comparing the detected acceleration with a reference acceleration. In the step of determining, the degree of curing is then determined depending on the comparison or the comparison result.

A further aspect of the present invention is a computer program configured to carry out the steps of the test method according to the present invention.

A further aspect of the present disclosure is a machine—readable storage medium on which a computer program according to the present disclosure is stored.

A further aspect of the present disclosure is a device configured to carry out the steps of the test method according to the present disclosure.

BRIEF DESCRIPTION OF THE DRAWINGS

Further features and advantages of the aspects of the present disclosure are explained below on the basis of embodiments with reference to the figures.

In the figures.

DETAILED DESCRIPTION

Figure 1A:
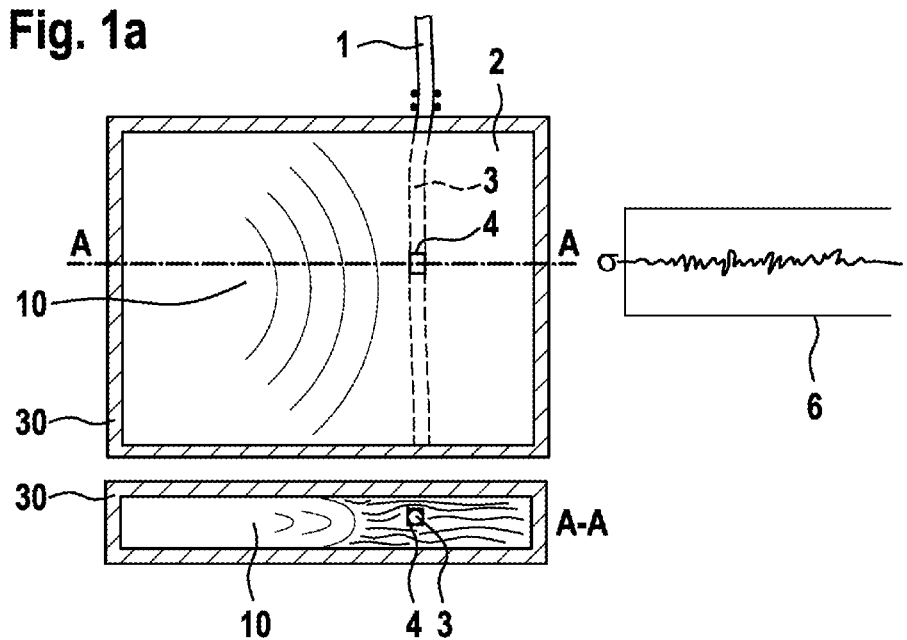
FIGS. 1a, b show schematic illustrations of a process step during the production of a fiber composite component according to the present disclosure (view into the interior of the tool/section through the tool)

FIG. 1a shows a schematic illustration of a process step during the production of a fiber composite component 2 according to the present disclosure. The illustration shows a process step during production in a Liquid Composite Molding (LCM) method of a fiber composite component comprising a sensor device 1 with a flexible circuit carrier 3 and/or a sensor module 4, said sensor device being arranged in the fiber composite component. The process step illustrates the start of the melt flow (matrix flow) 10.

The upper part of the illustrated view is a plan view of the tool 30 (view into the interior of the tool/section through the tool). The lower part is a side view of the tool 30 on the sectional axis A-A.

A signal profile 6 of the sensor device 1 or of the acceleration detected by the sensor module 4 is plotted schematically alongside the views of the tool 30. Normal production noise can be gathered from the signal profile 6.

Figure 1B:
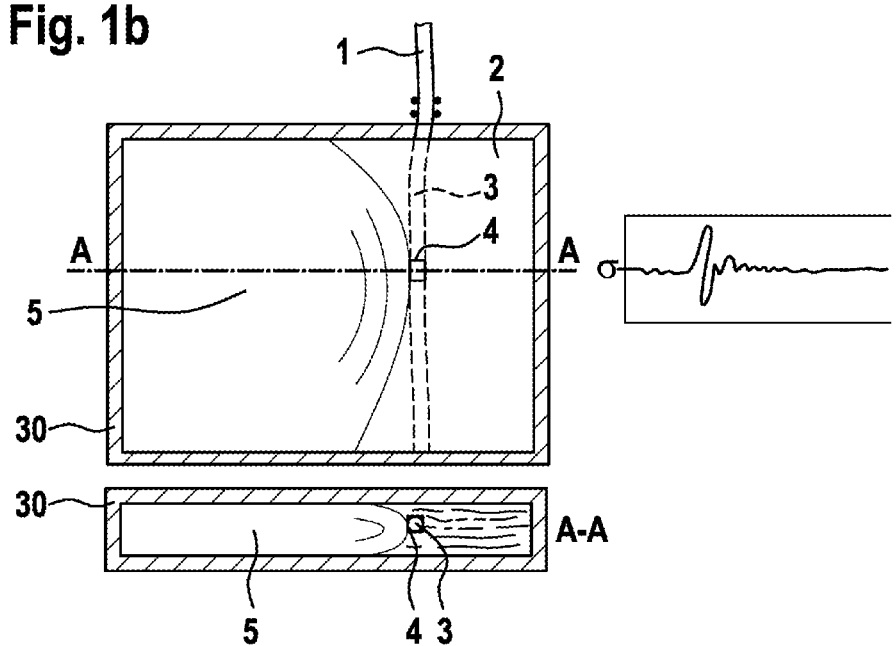

FIG. 1b shows a schematic illustration of a process step during the production of a fiber composite component 2 according to the present disclosure. The process step illustrates the point in time of the melt flow (matrix flow) 5 arriving at the sensor module 4.

The upper part of the illustrated view is a plan view of the tool 30. The lower part is a side view of the tool 30 on the sectional axis A-A.

A signal profile 6 of the sensor device 1 or of the acceleration detected by the sensor module 4 is plotted schematically alongside the views of the tool 30. An excursion is clearly discernible in the signal profile 6. The excursion is caused by the melt flow (matrix flow) 5 impinging on the sensor module 4.

By way of the type and in particular the intensity of the excursion, it is possible to deduce the process parameters used in the method step and to evaluate them. By way of example, the propagation of the flow front or the mold filling or the degree of curing of the fiber composite component can be derived from the excursion.

Figure 2A:
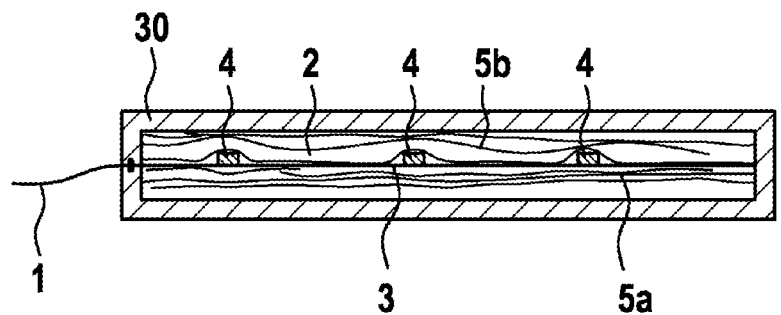
FIGS. 2a-c show schematic illustrations of a tool for producing a fiber composite component according to the present disclosure (view into the interior of the tool/section through the tool)

FIG. 2a shows a schematic illustration of a tool 30 (view into the interior of the tool/section through the tool) for producing a fiber composite component 2 according to the present disclosure. The tool 30 illustrated is designed in such a way that in order to produce a fiber composite component 2, the textile fibers or the textile semifinished product (textile layers) 5a, 5b and the sensor device 1 having a flexible circuit carrier 3 with a number of sensor modules 4 are inserted into the tool 30. The sensor device 1 is inserted between an arbitrary number of upper textile layers 5b and an arbitrary number of lower textile layers 5a. By means of the tool 30 illustrated, it is possible, in particular in the step of injecting the matrix, to mold a zone composed of pure matrix, preferably a pure resin zone, around the sensor modules and/or connecting units.

The step of integrating (as the sum of all the method steps) can simultaneously be the near net shape production of the component.

Figure 2B:
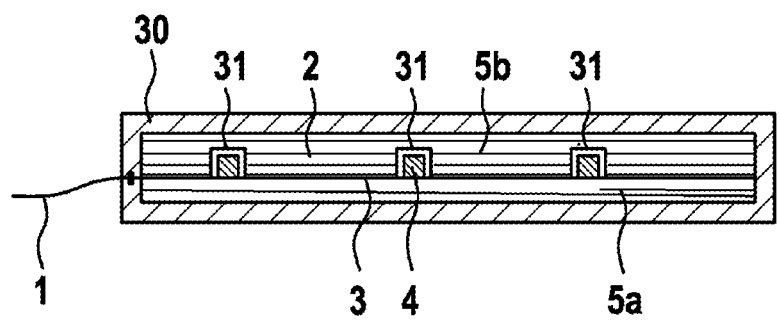

FIG. 2b shows a schematic illustration of one embodiment of a tool 30 for producing a fiber composite component 2 according to the present disclosure. In accordance with this embodiment, the tool 30 has prefabricated cutouts 31 for the sensor modules 4 and/or connecting units arranged on the flexible circuit carrier 3.

Figure 2C:
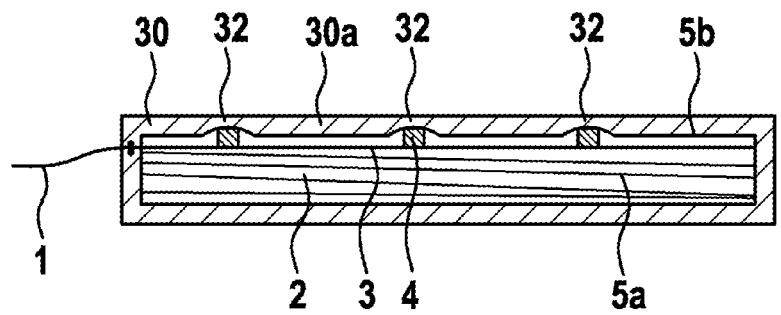

FIG. 2c shows a schematic illustration of a further embodiment of a tool 30 for producing a fiber composite component 2 according to the present disclosure. In accordance with this embodiment, the upper half 30a of the tool has cavities 32 corresponding to the sensor modules 4 and/or connecting units arranged on the flexible circuit carrier 3. According to this embodiment of the tool 30, it is possible to arrange an arbitrary number of textile layers 5a below the flexible circuit carrier 3 and to arrange a number of textile layers 5b above the flexible circuit carrier 3 provided that they can still be draped above the sensor module 4 situated on the circuit carrier 3.

Figure 3:
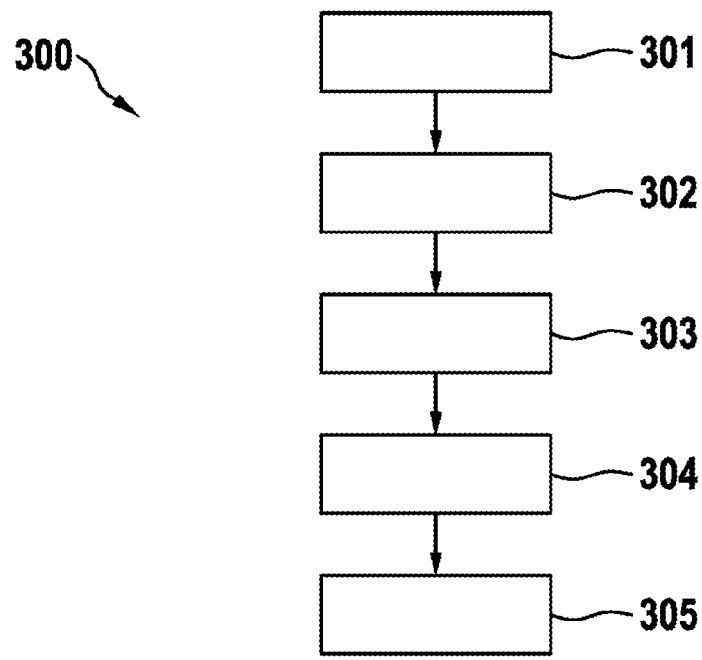
FIG. 3 shows a flow diagram of a production method according to the present disclosure.

FIG. 3 shows a flow diagram of a production method 300 according to the present disclosure.

The production method 300 is suitable for producing a fiber composite component in which a sensor device 1 with a flexible circuit carrier 3 and/or a sensor module 4 is arranged or integrated.

The method 300 comprises the following steps illustrated in FIG. 3.

In step 301, a tool 30 for producing the fiber composite component is fed with textile fibers or a textile semifinished product (textile layers) 5a, 5b and the sensor device 1.

In step 302, the fed tool is closed and the textile layers 5a, 5b and the sensor device 1 are compressed.

The tool 30 can be closed in an airtight manner.

In step 303, a liquid matrix 10 is introduced into the closed tool 30 for producing the fiber composite component.

The matrix 10 can be a resin. The resin can be a pure resin.

Step 304 involves detecting an acceleration 6 in relation to introducing in 303 and/or closing the tool 302 by means of the sensor device 1 or the sensor module 4 of the sensor device 1.

The detecting 304 can be effected in real time.

In step 305, the process parameters of the production method 300 are derived, evaluated and optimized depending on the detected acceleration 6.

The steps of loading 301, closing 302 and introducing 303 have a mandatory order corresponding to the order presented. The steps of detecting 304 and deriving, evaluating and optimizing 305 can be effected in parallel with the other steps 301-303 of the method 300. These steps 304, 305 can be effected multiply or regularly or permanently or continuously during the production method 300.

Figure 4:
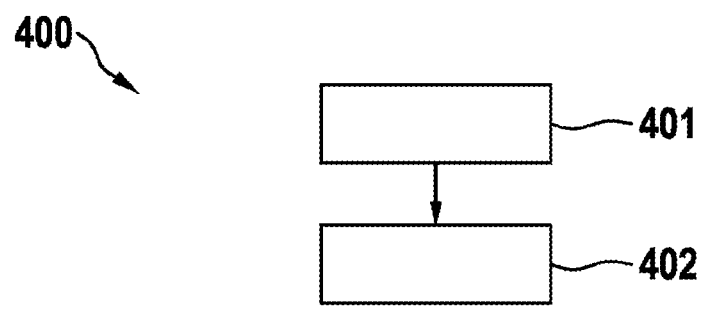
FIG. 4 shows a flow diagram of a test method according to the present disclosure.

FIG. 4 shows a flow diagram of a test method according to the present disclosure.

The test method can be effected during the curing in the tool in the context of the production of a fiber composite component according to the present disclosure. The fiber composite component has a sensor device 1 with one or a plurality of flexible circuit carriers 3 and/or one or a plurality of sensor modules 4. The fiber composite component may have been produced or be produced according to the production method 400 according to the present disclosure.

In step 401, an acceleration 6 is detected by means of the sensor device 1 or the sensor module 4 of the sensor device 1.

The detecting 401 can be effected in reaction to a predetermined impulse being applied to the fiber composite component to be tested and/or to a tool 30 for producing a fiber composite component having the fiber composite component to be tested.

In step 402, a degree of curing of the fiber composite component to be tested is determined depending on the detected acceleration 6.

The invention claimed is:

1. A method for producing a fiber composite component, in which at least one sensor device having at least one flexible circuit carrier and/or at least one sensor module is integrated, the method comprising:
    feeding a tool for producing the fiber composite component with textile layers and the at least one sensor device;
    closing the fed tool and compressing the textile layers and the at least one sensor device;
    introducing a liquid matrix into the closed tool for producing the fiber composite component;
    detecting an acceleration in relation to the introducing of the liquid matrix and/or the closing of the loaded tool with the at least one sensor device and/or the at least one sensor module of the at least one sensor device; and
    deriving and/or evaluating a process parameter of the production method depending on the detected acceleration.

2. The method according to claim 1, wherein the feeding of the tool comprises:
    inserting the at least one of the at least one sensor device and the at least one flexible circuit carrier between the textile layers;
    positioning the at least one of the at least one sensor device and the at least one flexible circuit carrier; and
    fixing the at least one of the at least one sensor device and the at least one flexible circuit carrier.

3. The method according to claim 2, wherein the positioning of the at least one of the at least one sensor device and the at least one flexible circuit carrier includes positioning the at least one of the at least one sensor device and the at least one flexible circuit carrier in relation to the textile layers and/or the tool.

4. The method according to claim 1 further comprising:
    opening the tool after introducing the liquid matrix, wherein the detecting of the acceleration and the deriving and/or evaluating of the process parameter are also effected in relation to the opening of the tool.

5. The method according to claim 1, wherein the at least one sensor module is a micromechanical acceleration sensor module.

6. The method according to claim 1, wherein the closing of the fed tool includes closing the fed tool in an airtight manner.

7. The method according to claim 1, wherein the introducing of the liquid matrix includes introducing a resin into the closed tool.

8. The method according to claim 7, wherein the introducing of the liquid matrix includes introducing a pure resin into the closed tool.

9. The method according to claim 1, wherein the detecting of the acceleration includes detecting the acceleration in real time.

10. A fiber composite component, comprising:
    at least one sensor device integrated in the fiber composite component, the sensor device including at least one flexible circuit carrier and/or at least one sensor module,
    wherein the fiber composite component is produced by feeding a tool for producing the fiber composite component with textile layers and the at least one sensor device; closing the fed tool and compressing the textile layers and the at least one sensor device; introducing a liquid matrix into the closed tool for producing the fiber composite component; detecting an acceleration in relation to the introducing of the liquid matrix and/or the closing of the fed tool with the at least one sensor device and/or the at least one sensor module of the at least one sensor device; and deriving and/or evaluating a process parameter of the production method depending on the detected acceleration.

11. The fiber composite component according to claim 10, wherein the at least one sensor module includes a plurality of micromechanical acceleration sensor modules.

12. A method for testing a fiber composite component in which at least one sensor device with at least one flexible circuit carrier and/or at least one sensor module is integrated, in which the fiber composite component is produced by the introduction of a liquid matrix into a tool, the method for testing comprising:
    detecting an acceleration in relation to the introduction of the liquid matrix into the tool with the at least one sensor device and/or the at least one sensor module of the at least one sensor device; and
    determining a degree of curing of the fiber composite component depending on the detected acceleration.

13. The method according to claim 12, further comprising:
    comparing the detected acceleration with a reference acceleration, wherein the determining of the degree of curing includes determining the degree of curing based on the comparison.

14. A computer program configured to execute the method according to claim 12.

15. A machine-readable storage medium comprising:
at least one memory on which the computer program of claim 14 is stored.

16. A device configured to execute the method according to claim 12.

17. The method according to claim 12, wherein the at least one sensor module includes a plurality of micromechanical acceleration sensor modules.

18. The method according to claim 12, wherein the method is performed during curing the fiber composite component during production of the fiber composite component.

19. The method according to claim 12, wherein the detecting of the acceleration includes detecting the acceleration in response to application of a predetermined impulse applied to the fiber composite component and/or a tool for producing the fiber composite component.

\* \* \* \* \*